(12) United States Patent
Emig et al.

(10) Patent No.: US 8,077,154 B2
(45) Date of Patent: Dec. 13, 2011

(54) ELECTRICALLY NON-INTERFERING PRINTING FOR ELECTRONIC DEVICES HAVING CAPACITIVE TOUCH SENSORS

(75) Inventors: David M. Emig, Trenton, IL (US); Ken K. Foo, Gurnee, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1000 days.

(21) Appl. No.: 11/838,061

(22) Filed: Aug. 13, 2007

(65) Prior Publication Data

US 2009/0046072 A1 Feb. 19, 2009

(51) Int. Cl.
*G06F 3/041* (2006.01)
*G01B 7/16* (2006.01)
(52) U.S. Cl. .......................... 345/173; 73/780
(58) Field of Classification Search ........... 345/173–183; 73/780
See application file for complete search history.

(56) References Cited

U.S. PATENT DOCUMENTS

| | | |
|---|---|---|
| 3,915,548 A | 10/1975 | Opittek et al. |
| 4,017,848 A | 4/1977 | Tannas, Jr. |
| 4,078,257 A | 3/1978 | Bagley |
| 4,422,721 A | 12/1983 | Hahn et al. |
| 4,462,924 A | 7/1984 | Raynes |
| 4,500,173 A | 2/1985 | Leibowitz et al. |
| 4,545,648 A | 10/1985 | Shulman et al. |
| 4,728,936 A | 3/1988 | Guscott et al. |
| 4,893,903 A | 1/1990 | Thakar et al. |
| 5,121,234 A | 6/1992 | Kucera |
| 5,225,818 A | 7/1993 | Lee-Weng Kai et al. |
| 5,231,381 A | 7/1993 | Duwaer |
| 5,376,948 A | 12/1994 | Roberts |
| 5,600,459 A | 2/1997 | Roy et al. |
| 5,796,454 A | 8/1998 | Ma |
| 5,818,615 A | 10/1998 | Abileah et al. |
| 6,047,196 A | 4/2000 | VeliMatti et al. |

(Continued)

FOREIGN PATENT DOCUMENTS

EP 1341029 9/2003

(Continued)

OTHER PUBLICATIONS

Joseph, Dennis "Final Office Action", U.S. Appl. No. 11/679,233, filed Feb. 27, 2007, Adam Cybart et al., inventors, Mailed Apr. 29, 2010.

(Continued)

*Primary Examiner* — Mike Qi
(74) *Attorney, Agent, or Firm* — Philip H. Burrus, IV

(57) ABSTRACT

A capacitive sensor (200) for a touch sensitive electronic device (800) includes at least one graphic (401) visible to a user. The graphic (401) is configured so as to be non-electrically interfering with the electrode array of the capacitive sensor (200). A substrate (101), configured to transmit light, has a layer of capacitive sensor material (201) deposited thereon. The layer of capacitive sensor material (201) is electrically conductive and pellucid. A layer of selectively disposed electrically conductive material (202) is then electrically coupled to the layer of capacitive sensor material (201). The layer of selectively disposed electrically conductive material (202) is arranged as a graphic, which may be a logo, brand, or other mark. The layer of selectively disposed electrically conductive material (202) has a reflectivity that is greater than the layer of capacitive sensor material (201) so as to make the graphic (401) visible to a user.

20 Claims, 10 Drawing Sheets

U.S. PATENT DOCUMENTS

| | | | |
|---|---|---|---|
| 6,058,164 | A | 5/2000 | Ibuka et al. |
| 6,103,384 | A | 8/2000 | Mario |
| 6,144,359 | A | 11/2000 | Grave |
| 6,150,962 | A | 11/2000 | Rossmann |
| 6,188,379 | B1 | 2/2001 | Kaneku |
| 6,211,931 | B1 | 4/2001 | Ryuzo et al. |
| 6,243,080 | B1 | 6/2001 | Molne |
| 6,271,835 | B1 | 8/2001 | Hoeksma |
| 6,310,609 | B1 | 10/2001 | Norgenthaler |
| 6,325,424 | B1 | 12/2001 | Metcalfe |
| 6,327,376 | B1 | 12/2001 | Harkin |
| 6,470,196 | B1 | 10/2002 | Yamashita |
| 6,574,044 | B1 | 6/2003 | Sahouani et al. |
| 6,574,487 | B1 | 6/2003 | Smith et al. |
| 6,646,697 | B1 | 11/2003 | Kanetaka et al. |
| 6,662,244 | B1 | 12/2003 | Takahashi |
| 6,704,004 | B1 | 3/2004 | Ostergård et al. |
| 6,768,481 | B2 | 7/2004 | Ozawa et al. |
| 6,768,586 | B2 | 7/2004 | Sahouani et al. |
| 6,813,957 | B1 | 11/2004 | Platz |
| 6,819,316 | B2 * | 11/2004 | Schulz et al. ............. 345/174 |
| 6,819,380 | B2 | 11/2004 | Wen et al. |
| 6,842,170 | B1 | 1/2005 | Akins et al. |
| 6,914,874 | B2 * | 7/2005 | Kondo ............. 369/275.1 |
| 6,968,744 | B1 * | 11/2005 | Silverbrook et al. ......... 73/724 |
| 7,106,517 | B2 | 9/2006 | Olczak |
| 7,123,945 | B2 | 10/2006 | Kokubo |
| 7,127,705 | B2 | 10/2006 | Christfort |
| 7,139,114 | B2 | 11/2006 | Schmitz et al. |
| 7,180,672 | B2 | 2/2007 | Olczak |
| 7,191,150 | B1 | 3/2007 | Shao et al. |
| 7,345,671 | B2 | 3/2008 | Robbin et al. |
| 2002/0090980 | A1 | 7/2002 | Wilcox et al. |
| 2002/0123946 | A1 | 9/2002 | Haworth et al. |
| 2002/0123962 | A1 | 9/2002 | Bryman et al. |
| 2003/0020999 | A1 | 1/2003 | Tsujimura et al. |
| 2003/0025679 | A1 | 2/2003 | Taylor et al. |
| 2003/0054867 | A1 | 3/2003 | Dowlat et al. |
| 2003/0058223 | A1 | 3/2003 | Tracy et al. |
| 2004/0036680 | A1 | 2/2004 | Davis et al. |
| 2004/0058718 | A1 | 3/2004 | Yu |
| 2004/0073504 | A1 | 4/2004 | Bryman et al. |
| 2004/0104826 | A1 | 6/2004 | Philipp |
| 2004/0189591 | A1 | 9/2004 | du Breuil |
| 2004/0218121 | A1 | 11/2004 | Zhuang et al. |
| 2004/0246580 | A1 | 12/2004 | Hassan et al. |
| 2004/0265602 | A1 * | 12/2004 | Kobayashi et al. ........... 428/458 |
| 2005/0007339 | A1 | 1/2005 | Sato |
| 2005/0020316 | A1 | 1/2005 | Mahini |
| 2005/0020325 | A1 | 1/2005 | Enger et al. |
| 2005/0030048 | A1 | 2/2005 | Bolender et al. |
| 2005/0030292 | A1 | 2/2005 | Diederiks |
| 2005/0064913 | A1 | 3/2005 | Kim |
| 2005/0088417 | A1 | 4/2005 | Mulligan |
| 2005/0093767 | A1 | 5/2005 | Lu et al. |
| 2005/0114825 | A1 | 5/2005 | Leung et al. |
| 2005/0134549 | A1 | 6/2005 | Kamiya et al. |
| 2005/0171901 | A1 | 8/2005 | Rosenblatt et al. |
| 2005/0243069 | A1 | 11/2005 | Yorio et al. |
| 2005/0264190 | A1 | 12/2005 | Park et al. |
| 2005/0266891 | A1 | 12/2005 | Mullen |
| 2006/0026535 | A1 | 2/2006 | Hotelling et al. |
| 2006/0038937 | A1 | 2/2006 | Kaneko et al. |
| 2006/0046792 | A1 | 3/2006 | Hassemer et al. |
| 2006/0080236 | A1 | 4/2006 | Welker et al. |
| 2006/0146012 | A1 | 7/2006 | Arneson et al. |
| 2006/0161870 | A1 | 7/2006 | Hotelling et al. |
| 2006/0161871 | A1 | 7/2006 | Hotelling |
| 2006/0166702 | A1 | 7/2006 | Deitz et al. |
| 2006/0197753 | A1 | 9/2006 | Hotelling |
| 2006/0266640 | A1 * | 11/2006 | Halsey et al. ............ 204/192.29 |
| 2006/0277472 | A1 | 12/2006 | Yodo et al. |
| 2006/0277478 | A1 | 12/2006 | Seraji et al. |
| 2006/0290871 | A1 | 12/2006 | Harada |
| 2007/0030438 | A1 | 2/2007 | Chiang |
| 2007/0052689 | A1 | 3/2007 | Takahashi |
| 2007/0075965 | A1 | 4/2007 | Huppi et al. |
| 2007/0097595 | A1 | 5/2007 | Radivojevic et al. |
| 2007/0152983 | A1 | 7/2007 | McKillop et al. |
| 2007/0164986 | A1 | 7/2007 | Jeong et al. |
| 2007/0273662 | A1 | 11/2007 | Lian et al. |
| 2008/0122796 | A1 | 5/2008 | Jobs et al. |
| 2008/0169944 | A1 | 7/2008 | Howarth et al. |
| 2008/0204417 | A1 * | 8/2008 | Pierce et al. .................. 345/168 |
| 2008/0211734 | A1 | 9/2008 | Huitema et al. |
| 2008/0309589 | A1 * | 12/2008 | Morales ......... 345/36 |

FOREIGN PATENT DOCUMENTS

| | | |
|---|---|---|
| EP | 1467536 | 10/2004 |
| GB | 2348039 A | 9/2000 |
| GB | 2359178 | 8/2001 |
| JP | 03-180920 | 8/1991 |
| JP | 08-063271 | 3/1996 |
| JP | 2002-049461 | 2/2002 |
| JP | 2003-101622 | 4/2003 |
| JP | 2005-100186 | 4/2005 |
| JP | 2005352987 A | 12/2005 |
| JP | 2006-091486 A | 4/2006 |
| JP | 2006-243658 A | 9/2006 |
| JP | 2006-2874757 A | 10/2006 |
| KR | 10-1998-0026397 | 7/1998 |
| KR | 20-0225646 | 6/2001 |
| KR | 10-2004-0019677 | 3/2004 |
| KR | 100652767 | 11/2006 |
| KR | 10-2006-0134659 | 12/2006 |
| KR | 10-2007-0109603 | 11/2007 |
| WO | WO-03-104884 | 12/2003 |
| WO | WO-03-104884 A2 | 12/2003 |
| WO | WO-2006/094308 | 9/2006 |
| WO | 2006116145 A2 | 11/2006 |
| WO | 2006123294 A2 | 11/2006 |
| WO | WO 2007/063809 A1 | 6/2007 |

OTHER PUBLICATIONS

Moorad, Waseem "Non-Final Office Action", U.S. Appl. No. 11/751,175, filed May 21, 2007, David S. Brenner, inventor, Mailed May 19, 2010.

Hegarty, Kelly B., "Non-Final Office Action", U.S. Appl. No. 11/762,481, filed Jun. 13, 2007, Joseph M. Morales, inventor, Mailed May 14, 2010.

Walthall, Allison N., "Final Office Action", U.S. Appl. No. 11/766,921, filed Jun. 22, 2007, Robert D. Polak, inventor, Mailed May 18, 2010.

Tsvey, Gennadiy "Final Office Action", U.S. Appl. No. 11/684,476, filed Mar. 9, 2007, Paul M. Pierce, inventor, Mailed May 25, 2010.

Sitta, Grant " Final Office Action", U.S. Appl. No. 11/741,877, filed Apr. 30, 2010, XiaoPing Bai first inventor, Mailed Jun. 2, 2010.

Tsvey, Gennadiy "Final Office Action", U.S. Appl. No. 11/684,454, filed Mar. 9, 2007, Paul M. Pierce, first inventor, Mailed May 28, 2010.

Marinelli, Patrick "Non-Final Office Action", U.S. Appl. No. 11/836,973, filed Aug. 10, 2007, Pual M. Pierce, first inventor, Mailed Aug. 17, 2010.

Sony Operation Guide, Publication Date Unknown.

Hegarty, Kelly "Final Office Action", U.S. Appl. No. 11/762,481, filed Jun. 13, 2007, Joseph M. Morales, first inventor, Mailed Oct. 13, 2010.

Schnirel, Andrew "Final Office Action", U.S. Appl. No. 11/679,228, filed Feb. 27, 2007, Adam Cybart, first inventor, Mailed Oct. 28, 2010.

Edwards, Carolyn R., "First Office Action", First inventor: Paul Pierce, filed Aug. 9, 2007 U.S. Appl. No. 11/836,616 Mail date: Nov. 23, 2010.

Moorad, Waseem "Final Office Action", U.S. Appl. No. 11/751,175, filed May 21, 2010, Mailed Dec. 9, 2010.

Schneider, Michael "PCT Search Report and Opinion", Date of search: May 3, 2010 Date mailed: May 11, 2010 Filed: 08728978.1-2224/2115555.

Joseph, Dennis P., et al., "Non-Final Office Action", U.S. Appl. No. 11/679,233, filed Feb. 27, 2007 First Inventor: Adam Cybart Mailed: Feb. 2, 2011.

Tsvey, Gennadiy "Non-Final Office Action", U.S. Appl. No. 11/684,454, mailed Nov. 9, 2009.

Tsvey, Gennadiy "Non-Final Office Action", U.S. Appl. No. 11/684,476, mailed Oct. 9, 2009.
Joseph, Dennis P., "Non-Final Office Action Mailed Nov. 13, 2009", U.S. Appl. No. 11/679,233, filed Feb. 27, 2007, First Inventor Adam Cybart.
Walthall, Allison N., "Non-Final Office Action", U.S. Appl. No. 11/766,921, filed Jun. 22, 2007, Mailed Jan. 27, 2010.

Schnirel, Andrew B., "Non-Final Office Action", U.S. Appl. No. 11/679,228, filed Feb. 27, 2007, Adam Cybart, inventor, Mailed Mar. 10, 2010.
United States Patent and Trademark Office, "Non-Final Office Action Summary", May 5, 2011, pp. 1-15, U.S. Appl. No. 11/762,481.

* cited by examiner

ELECTRICALLY NON-INTERFERING PRINTING FOR ELECTRONIC DEVICES HAVING CAPACITIVE TOUCH SENSORS

BACKGROUND

1. Technical Field

This invention relates generally to capacitive sensors for electronic devices, and more specifically to a device having visible printing adjacent to capacitive sensing devices, where the visible printing does not interfere with the electrical operation of the sensing devices.

2. Background Art

Electronic devices are continually becoming more advanced. The devices are becoming smaller, memories are becoming larger, more features are being added, and processing power is increasing. Some electronic devices today, including personal digital assistants and mobile telephones, have the processing power of a computer, yet still fit easily into a shirt pocket.

One of the advances in electronic device technology involves the user interface. Traditional electronic devices generally included only keys or buttons for data entry. When a user wanted to enter a phone number, for example, the user pressed sequential buttons on the electronic device.

The advent of the touch sensitive display or user input transformed conventional user interface technology. With an electronic device having a touch sensitive surface, rather than pressing keys or buttons, the user is able to interact with the device and enter data by simply placing a finger on a surface of the device. Sometimes the surface will coincide with a device display, thereby transforming a display into a touch sensitive display or screen. Touch sensitive user input devices often simplify the overall appearance of the device as a simple touch sensitive display can eliminate the need for a tethered full keyboard, as the same can sometimes be reproduced as needed in conjunction with the touch sensitive screen.

There are many different touch sensitive technologies. In capacitive sensing technologies, capacitive touch sensors detect the presence of an object, such as a finger or stylus, by determining a changing current flow at the contact point. Exemplary capacitive sensors are taught in, for example, U.S. Pat. Nos. 4,071,691, 4,129,747, 4,198,539, 4,293,734, 4,302,011, 4,371,746, and 4,430,917.

One problem associated with capacitive sensing technologies involves electrical interference. For a capacitive sensor to function properly, an electrical field must be allowed to propagate from one capacitive sensor outside the device and back to another sensor. Any material that interferes with this electrical field can compromise reliability. For example, if the capacitive sensor is placed beneath a protective cover layer having vacuum-metalized printing, the metal in the printing can function as a shield, thereby interfering with the resulting electrical field and inhibiting the operation of the capacitive sensor.

This is a problem because device manufacturers often like to include printing somewhere on the surface of the device. Such printing may indicate to the user the model or manufacturer of the device. Such printing may also include instructions on using the device. Without such printing, the user's ability to operate the device may be slowed or inhibited.

There is thus a need for a method of creating visible printing in an electronic device employing a capacitive sensor, where the printing does not interfere with the electrical operation of the capacitive sensor.

Figure 1:
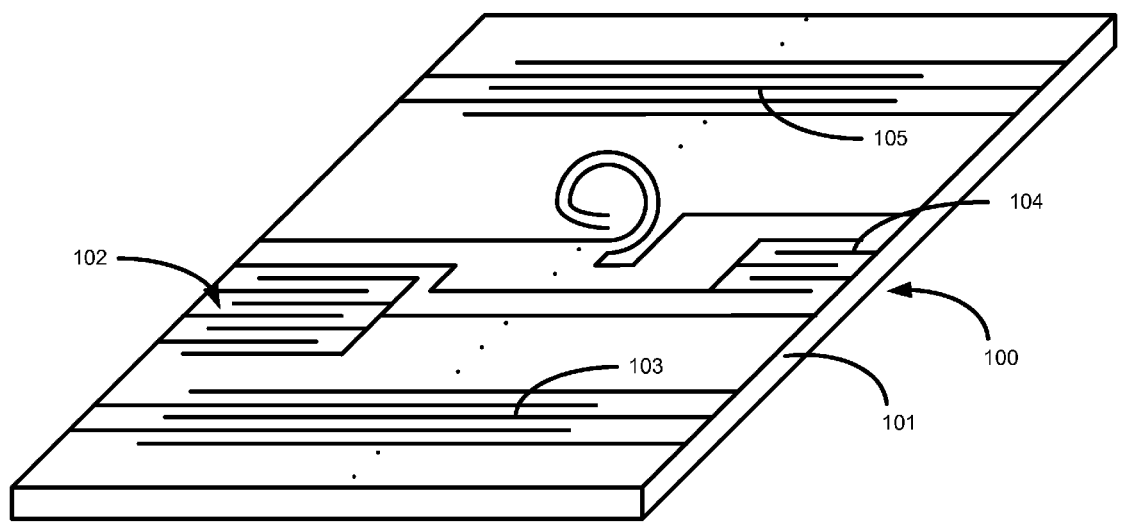
FIG. 1 illustrates one embodiment of a capacitive sensor in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related printing a non-electrically interfering graphic, visible to a user, for use in conjunction with a capacitive sensor or proximity detector. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Briefly, embodiments of the present invention relate to a capacitive sensor for an electronic device that is configured to present selected graphics to a user. The graphics may include symbols, brand marks, logos, and other information, and are visible to a user when looking at the user interface of the electronic device.

In one embodiment, the electronic device includes a "morphing" interface where user actuation targets are selectively hidden and revealed as the active mode of the device changes. Commonly assigned, co-pending U.S. patent applications, application Ser. Nos. 11/684,454 and 11/679,228, teach an electronic device having a morphing display capable of hiding and revealing various keypad interfaces. The keypad interfaces each comprise a plurality of user actuation targets. In some embodiments, the keypad configurations are associated with a particular mode of operation of the device.

One embodiment of the present invention includes a capacitive sensor having a substrate that is configured to transmit light. Examples of such substrates include at least semi-transparent plastic or glass. Disposed upon the substrate is a layer of capacitive sensor material that is electrically conductive and is also configured to transmit light. In selective areas, arranged as a graphic, a layer of electrically conductive material is disposed on the capacitive sensor material. As the electrically conductive material is electrically coupled to the capacitive sensor material, the electrically conductive material does not electrically interfere with the operation of the capacitive sensor. The electrically conductive material has a reflectivity that is greater than that of the capacitive sensor material, and thus reflects light back to the user. The user perceives this as visible printing on the user interface.

Turning now to FIG. 1, illustrated therein is a capacitive sensor 100 in accordance with one embodiment of the invention. The capacitive sensor 100 includes a plurality of capacitive sensing devices 102,103,104,105 disposed along a substrate 101. Each of the plurality of capacitive sensing devices 102,103,104,105 comprises a layer of capacitor sensor material deposited on the substrate 101. In one embodiment, suitable for use with a morphing display, the substrate is configured to transmit incident light. By way of example, the substrate may be manufactured from thin plastic film, sheet plastic, or reinforced glass. When the capacitive sensor 100 is employed in an electronic device, each of the plurality of capacitive sensing devices 102,103,104,105 is configured, in conjunction with associated control circuitry, to detect an object in close proximity with—or touching—a user interface of the electronic device.

The layer of capacitive sensor material is electrically conductive, and, in one embodiment, is pellucid. The layer of capacitive sensor material is arranged, as shown in FIG. 1, as a plurality of capacitive electrodes. One method of forming the transparent or at least semi-transparent plurality of capacitive sensing devices 102,103,104,105 is by printing solid indium-tin oxide ($In_2O_3 SnO_2$) (ITO) in the desired capacitor device patterns atop the substrate 101. Indium tin oxide is a mixture of indium oxide and tin oxide. In at least some formulations, indium tin oxide is substantially transparent and conductive, and is capable of being deposited in thin layers by way of a printing process. Indium tin oxide is well suited for embodiments of the present invention due to its combination of electrical conduction properties and optical transparency. The plurality of capacitive sensing devices 102, 103,104,105 may be deposited on the substrate 101 in any of a variety of ways, including electron beam evaporation, physical vapor deposition, or other various sputter deposition techniques. In addition to indium-tin oxide, other materials, including patterned conductive inks, may also used in the capacitor electrode construction.

Figure 2:
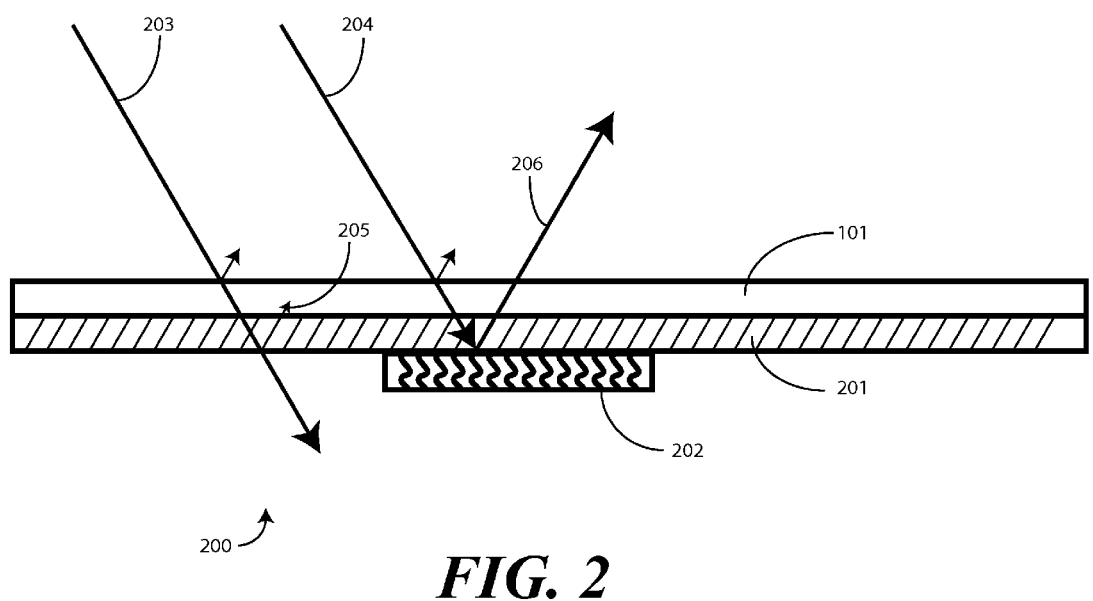
FIG. 2 illustrates one sectional view of a capacitive sensor in accordance with the invention.

Turning now to FIG. 2, illustrated therein is a sectional view of a capacitive sensor 200 for an electronic device configured to present selected graphics to a user in accordance with embodiments of the invention. From the sectional view of FIG. 2, both the substrate 101 and the layer of capacitive sensor material 201 may be seen. The layer of capacitive sensor material 201 is shown as a continuous layer for illustrative purposes. In practice, the layer of capacitive sensor material 201 may be initially deposited as a continuous layer and then selectively etched, thereby forming the desired electrode patterns.

Deposited upon the layer of capacitive sensor material 201 (although it could also be deposited beneath the layer of capacitive sensor material 201) is a layer of selectively disposed electrically conductive material 202. The layer of selectively disposed electrically conductive material 202 may be selectively deposited so as to be arranged as a graphic. This graphic can be a symbol, an alphanumeric character or text, a key or user actuation target, a navigation device, a brand mark, a logo, an identifier, an artistic rendering, or other pattern.

The layer of selectively disposed electrically conductive material 202 is electrically coupled to the layer of capacitive sensor material 201. In one embodiment, the layer of selectively disposed electrically conductive material 202 has a greater reflectivity than does the layer of capacitive sensor material 201. In one embodiment, the reflectivity of the layer of selectively disposed electrically conductive material 202 is at least twice that of the layer of capacitive sensor material 201. While both may be pellucid, more light passes through the layer of capacitive sensor material 201 than the layer of selectively disposed electrically conductive material 202. Thus, more light is reflected from the layer of selectively disposed electrically conductive material 202 than from the layer of capacitive sensor material 201. By arranging the layer of selectively disposed electrically conductive material 202 as at least one graphic, this layer serves as "printing" in that the user can see the graphic due to the difference in reflectivity.

In another embodiment, the layer of selectively disposed electrically conductive material 202 has a reflectivity that the same or less than the layer of capacitive sensor material. However, the combined material formed by the two layers has a reflectivity that is greater than that of the capacitive sensor material by itself. For example if both layers have 10% reflectance, neglecting absorption or reflection from other layers, the layer of capacitive sensor material 201 will exhibit a 10% reflection, while the combination layer areas will exhibit about 10%+(0.90)10%=19% reflection.

In one embodiment, both the layer of capacitive sensor material 201 and the layer of selectively disposed electrically conductive material 202 are indium-tin oxide layers. The reflectivity of the indium-tin oxide used for the layer of selectively disposed electrically conductive material 202 can be increased relative to that of the layer of capacitive sensor material 201 by altering the indium and tin concentrations. Specifically, oxygen can be removed, thereby increasing the proportions of indium and tin. This increase in indium and tin concentration has two effects: First, it reduces the characteristic impedance of the overall indium-tin oxide. Second, it makes the resulting indium-tin oxide less transparent or more reflective. As such, the metallic reflective properties of the resulting indium-tin oxide becomes more visible to a user. Thus, if the lower resistance (i.e., more reflective) indium-tin oxide is arranged geometrically as a desired graphical design, while the standard, higher resistance (i.e., less reflective) indium-tin oxide is patterned elsewhere, the visual effect of a graphical design having a metallic finish is achieved without introducing electrical interference to the capacitive sensor 200. Experimental testing has shown that indium-tin oxide having a characteristic impedance of around 300 Ohms is suitable for use as the layer of capacitive sensor material 201, while indium-tin oxide having a characteristic impedance of around 100 Ohms (or less) is suitable for use as the layer of selectively disposed electrically conductive material.

In another embodiment, the layer of capacitive sensor material 201 and the layer of selectively disposed electrically conductive material 202 may both be indium-tin oxide. The layer of selectively disposed electrically conductive material 202 may be fashioned by selectively depositing layer upon layer of the same indium-tin oxide used as the layer of capacitive sensor material 201. By depositing multiple layers atop each other, the thickness of the indium-tin oxide increases, causing the characteristic impedance to go down and the reflectivity to increase In yet another embodiment, metal, such as gold, tin, copper, nickel, or aluminum, may be used as the layer of selectively disposed electrically conductive material 202. Where the layer of capacitive sensor material 201 is indium-tin oxide, the layer of metal will have a greater reflectivity as the layer of metal will generally be opaque. Further, the layer of metal, serving as a metallic conductor, will generally have an impedance of well less than 100 Ohms. This is generally more conductive than standard (highly transparent) indium-tin oxide. As such, the response time associated with the capacitive sensor 200 will decrease, corresponding to a reduced RC time constant, thereby resulting in a decrease in the time needed to charge or discharge the associated capacitance through the associated resistance.

While the layer of selectively disposed electrically conductive material 202 is shown in FIG. 2 as being deposited on the same side of the substrate 101 as the layer of capacitive sensor material 201, it will be clear to those of ordinary skill in the art having the benefit of this disclosure that the invention is not so limited. The layer of selectively disposed electrically conductive material 202 could equally be disposed on the opposite side of the substrate 101, with the electrical coupling to the layer of capacitive sensor material 201 being achieved by vias through the substrate 101 or by connectors passing about the sides of the substrate 101.

Further, the layer of selectively disposed electrically conductive material 202 may be patterned in the shape of the desired graphical design on either side of the layer of capacitive sensor material 201. As the layer of selectively disposed electrically conductive material 202 is in electrical contact with the layer of capacitive sensor material 201, the layers work together to transmit the electric field used for capacitive sensing, while producing a visible graphical design.

When incident light 203 hits the highly transparent layer of capacitive sensor material 201, only a small portion 205 of light is reflected, thereby rendering the layer of capacitive sensor material 201 largely invisible to a user. By contrast, when incident light 204 hits the layer of selectively disposed electrically conductive material 202, most of the light 206 will be reflected, thereby presenting the graphical design to a user.

Figure 3:
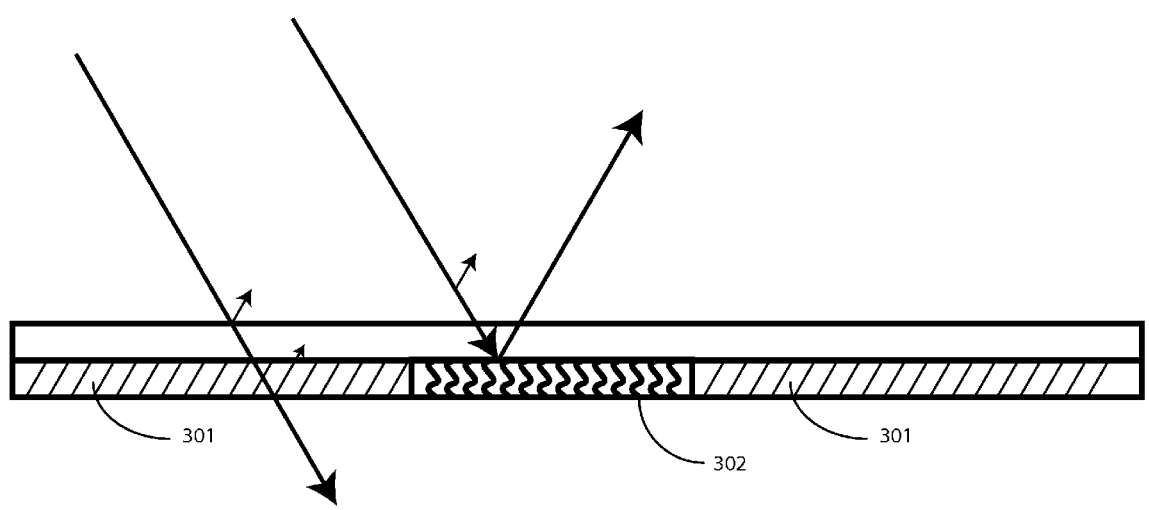
FIG. 3 illustrates one sectional view of a capacitive sensor in accordance with the invention.

Turning now to FIG. 3, illustrated therein is an alternate embodiment of a capacitive sensor 300 in accordance with embodiments of the invention. Whereas the layer of selectively disposed electrically conductive material (202) in FIG. 2 was shown as being disposed atop the layer of capacitive sensor material (201), in FIG. 3 the layer of selectively disposed electrically conductive material 302 is interspersed with the layer of capacitive sensor material 301. Such interspersion may be accomplished either by selective printing or by masking.

Figure 4:
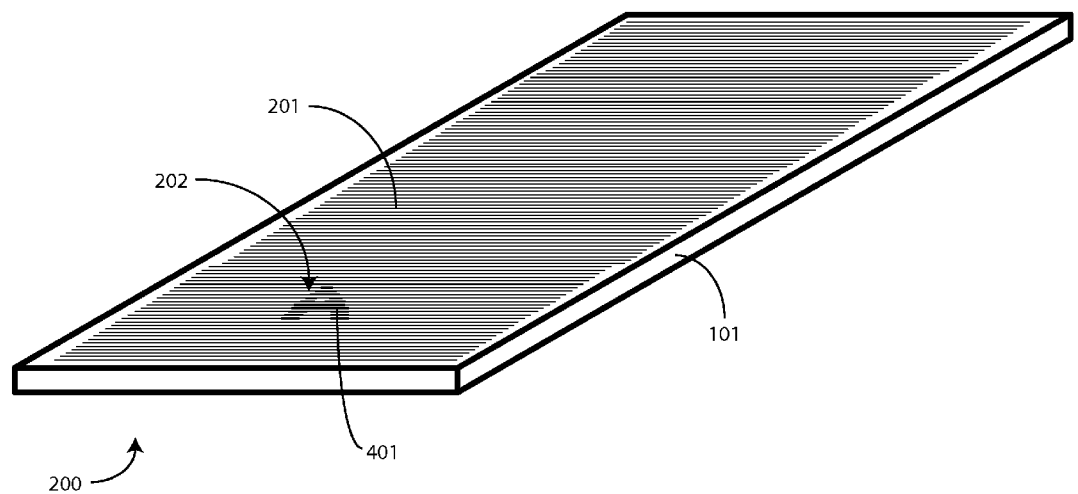
FIG. 4 illustrates one embodiment of a capacitive sensor having at least one graphic, visible to a user, in accordance with the invention.

Turning now to FIG. 4, illustrated therein is a perspective view of a capacitive sensor 200 configured to present selected graphics to a user in accordance with embodiments of the invention. The capacitive sensor 200 comprises at least two types of sensor material—a first material having a lower reflectivity and a second material having a higher reflectivity. As mentioned above, the second material may be a thicker layer of the first material. The two materials are electrically coupled together.

The first material, deposited as the layer of capacitive sensor material 201, is arranged as a plurality of capacitive electrodes. The second material, applied as the selectively disposed electrically conductive material 202, is arranged as at least one graphic 401 that will be visible through a transparent cover layer of an electronic device. The graphic 401, shown illustratively as the letter "A" in FIG. 4, may be a device model, brand mark, or other identifier.

Figure 5:
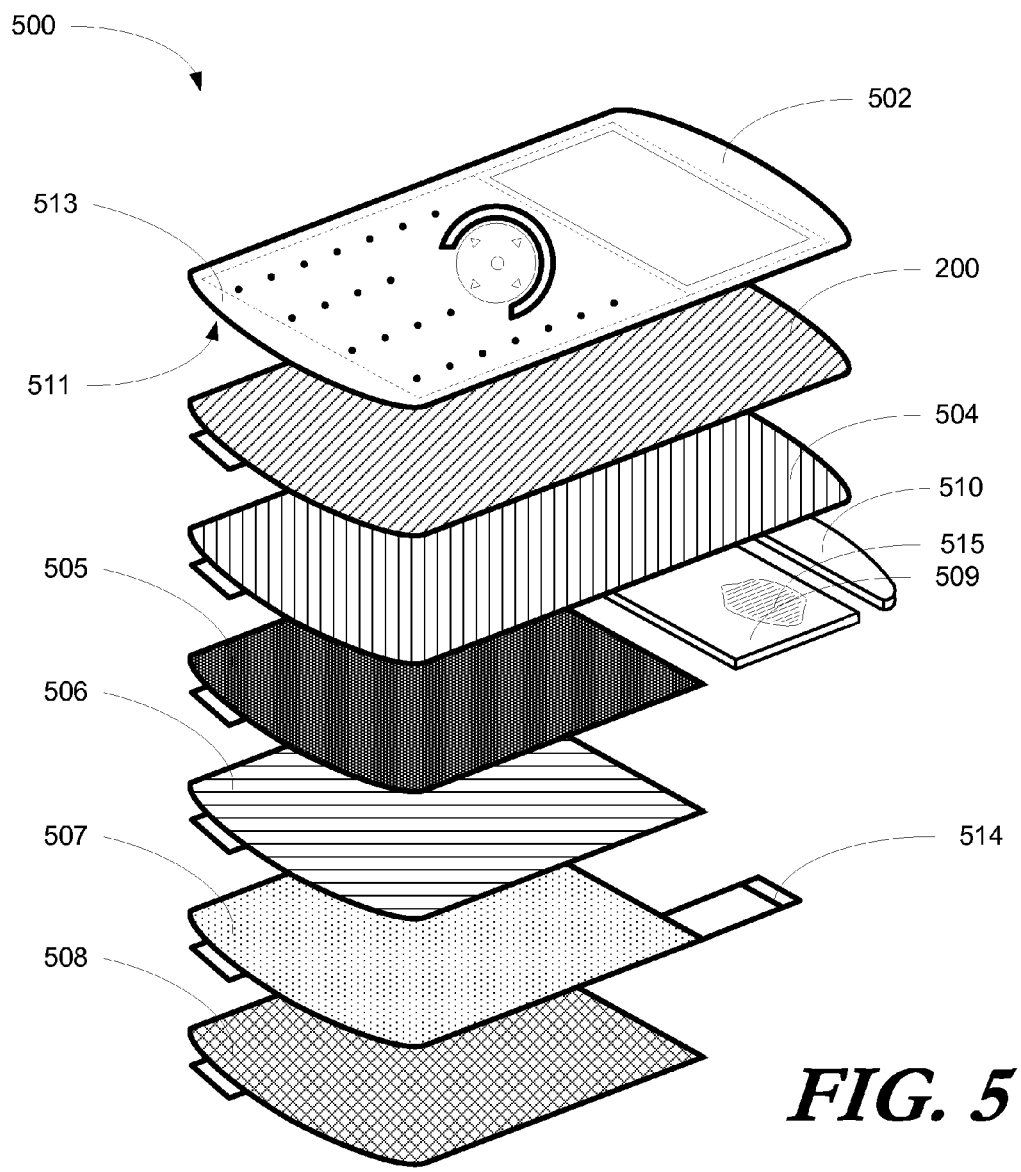
FIG. 5 illustrates an exploded view of one embodiment of an electronic device employing embodiments of the present invention.

Turning now to FIG. 5, illustrated therein is an exploded view of a dynamic user interface 500 for a portable electronic device that employs a capacitive sensor 200 in accordance with one embodiment of the invention. The user interface 500 is made from several layers, each layer implementing a different function. While several layers are shown, it will be clear to those of ordinary skill in the art having the benefit of this disclosure that each and every layer may not be required for a specific application. The structure of FIG. 5 is exemplary only.

The user interface 500 includes the following components: a cover layer 502; a capacitive sensor 200; an optical shutter assembly 504; an electroluminescent device 505, a resistive switch layer 506; a substrate layer 507; and a tactile feedback layer 508. Additionally, a high-resolution display 509 and filler materials 510 may be included to complete the assembly. While the layers are shown individually, it will be clear to those of ordinary skill in the art having the benefit of this disclosure that some of the various layers may be combined together. For instance, the cover layer 502 and capacitive sensor 200 may be integrated together to form a single layer. Similarly, the tactile feedback layer 508 may be integrated into the cover layer 502, and so forth.

Starting from the top with the cover layer 502, a thin film sheet serves as a unitary fascia member for the electronic device. A "fascia" is a covering or housing, which may or may not be detachable, for an electronic device like a mobile telephone. While the drawings herein employ a mobile telephone as an exemplary electronic device for discussion, it will be clear to those of ordinary skill in the art having the benefit of this disclosure that the invention is not so limited. The fascia of the present invention could be used for any electronic device having a display and a keypad.

The cover layer 502, in one exemplary embodiment, is a thin, flexible membrane. Suitable materials for manufacturing the thin, flexible membrane include clear or translucent plastic film, such as 0.4 millimeter, clear polycarbonate film. In another embodiment, the cover layer 502 is manufactured from a thin sheet of reinforced glass. The cover layer, being continuous and without holes or other apertures or perforations, is well suited to serve as a continuous fascia for the electronic device, keeping dust, debris and liquids from invading the device.

Printing may be disposed on the rear face 511 of the cover layer 502. Even where the capacitive sensor 200 and its non-electrically interfering printing in accordance with the invention is used, some peripheral selective printing on the cover layer may still be desirable. For instance, printing may be desired around the perimeter of the cover layer 502 to cover electrical traces connecting the various layers. Such peripheral printing generally does not significantly affect the performance of the capacitive sensor 200.

Non-conductive printing may be desired on the front face 513 for various reasons as well. For example, a subtle textural printing or overlay printing may be desirable to provide a translucent matte finish atop the electronic device. Alternatively, mechanical finishing techniques may apply such a matte finish. Such a finish is useful to prevent cosmetic blemishing from sharp objects or fingerprints. The cover layer 502 may also include an ultra-violet barrier. Such a barrier is useful both in improving the visibility of the high-resolution display 509 and in protecting internal components of the electronic device.

The capacitive sensor 200 may be any of the capacitive sensor structures described herein. The capacitive sensor 200, which is formed by depositing small capacitive plate electrodes on a substrate, is configured to detect the presence of an object, such as a user's finger, near to or touching the user interface 500. Control circuitry, operating as a detector, detects a change in the capacitance of a particular plate combination on the capacitive sensor 200. The capacitive sensor 200 may be used in a general mode, for instance to detect the general proximate position of an object relative to the device. The capacitive sensor 200 may also be used in a specific mode, where a particular capacitor electrode pair may be detected to detect the location of an object along length and width of the front surface of the electronic device. In this mode, the capacitive sensor 200 may be used to detect the proximate position of an object, such as a user's finger, relative to any of the actuation targets presented.

Turning to the optical shutter assembly 504, this layer includes a segmented electro-optical device configured as an optical shutter. A "segmented" electro-optical display device is used herein to mean a display device with less granularity than the high-resolution display 509. A "high-resolution display" refers to a device that can present text and images to a user by altering a large number of pixels which, when viewed collectively by a user, form the presented text or image. The high-resolution display is a display suitable for the presentation of text, information, and graphics on a mobile device with sufficient granularity as to be easily switched between graphics or text. For example, the high-resolution display would be one suitable for presenting an image in the Joint Photographics Expert Group (JPG) format to the user. Such displays generally are configured to turn on and off individual pixels by way of a display driver for the presentation of high-resolution information. Examples include a 256 pixel by 128 pixel reflective or backlit LCD. Such display devices are manufactured by Samsung and Sony.

A segmented display, by contrast, is a display device with less granularity than the high-resolution device. The segmented display device is capable of actuating a predefined segment or segments to present a predetermined text or symbol graphic to a user, but does not have sufficient granularity to easily transition from, for example, text to graphics. The segmented display of the optical shutter assembly 504 uses electrodes placed atop and beneath the optical shutter assembly 504 to open and close "windows", thereby transforming the window from a first, opaque state to a second, translucent state. The optical shutter assembly 504 is "segmented" because individual windows, or shutters, may be controlled. Further, by configuring the electrodes on at least one side of the optical shutter assembly 504, each shutter can be configured as the alphanumeric indicia, which may include numbers, letters, or symbols forming images representative of a plurality of actuatable keys.

The optical shutter assembly 504 is configured to present any of a plurality of keypad configurations to a user. Each keypad configuration, in one embodiment, corresponds to a particular mode of operation of the electronic device. For example, a music player mode may correspond to a first keypad configuration, while a phone mode may correspond to an alternate configuration. The optical shutter assembly 504 presents each of the plurality of keypad configurations by transitioning segments of the optical shutter assembly 504 from opaque states to translucent states. When translucent, light can pass through each shutter. When opaque, light is absorbed. The result is a reveal and concealment of each individual key. Each key forms an actuation target that can be selected by the user.

An electroluminescent device 505 may be included to provide a backlighting function to the shutters of the optical shutter assembly 504. As used herein, "electroluminescent" refers to any device capable of producing luminescence electrically, including light emitting diodes, and equivalent devices. Such a function is useful in improving the visibility of the keypad region in low-light conditions. In one embodiment, the electroluminescent device 505 includes a layer of backlight material sandwiched between a transparent substrate bearing transparent electrodes on the top and bottom. The electrodes, which may be segmented and patterned to correspond with the shutters of the optical shutter assembly 504. One electrode is an actuation electrode, while another electrode is a ground electrode. Where the electrodes are segmented, the actuation electrode is generally patterned. A reflector, integrated into the back of the electroluminescent device 505 allows incident light to be reflected back through the display, even when the electroluminescent elements are active.

The high-resolution display 509, which may have its own lighting system and may also include a polarizing layer 515 configured to polarize light along an axis of polarization, may be placed adjacent to the electroluminescent device 505. Further, filler material 510 may be included to complete the assembly.

The resistive switch layer 506 includes a force switch array configured to detect contact with any of one of the shutters dynamic keypad region or any of the plurality of actuation targets. An "array" as used herein refers to a set of at least one switch. For instance, where the cover layer 502 is manufactured from glass, one switch may be all that is necessary. However, when the cover layer 502 is manufactured from thin film plastic, multiple switches may be employed. The array of resistive switches functions as a force-sensing layer, in that when contact is made with the front surface, changes in impedance of any of the switches may be detected. The array of switches may be any of resistance sensing switches, membrane switches, force-sensing switches such as piezoelectric switches, or other equivalent types of technology.

When the cover layer 502 is made from thin plastic film, an array of switches may be included on the resistive switch layer to detect the proximate location of a finger actuating one of the keys. Experimental results have shown that a deflection of as little as 40 um along the cover layer is sufficient to actuate one of the resistive switches. When the cover layer 502 is made from glass, the capacitive sensor 200 may be used to detect the proximate location, while one or more switches on the resistive switch layer 506 may be used to detect actuation of the rigid cover layer 502. By employing control circuitry to combine this data, the exact shutter, region, and/or target actuated may be properly detected.

A substrate layer 507 is provided to carry the various conduits to control circuits and drivers for the layers of the display. The substrate layer 507, which may be either a rigid layer such as FR4 printed wiring board or a flexible layer such as copper traces printed on a flexible material such as Kapton®, includes electrical connections to components, integrated circuits, processors, and associated circuitry to control the operation of the display. The substrate layer 507 includes a connector 514 for coupling to the detector and other electrical components within the electronic device.

As noted in the discussion of the resistive switch layer 506 above, in one embodiment a modicum of deflection is all that is required to actuate one of the keys presented by the optical shutter assembly 504. Where the cover layer 402 is manufactured from thin film plastic, a minor deflection of the plastic will actuate a switch on the resistive switch layer 506. Where the cover layer 502 is manufactured from glass, a minor deflection of the entire cover layer 502 will actuate a switch on the resistive switch layer 506. This deflection is on the order of tens of micrometers. As such, a user may not perceive any deflection at all when pressing each key.

To provide tactile feedback, an optional tactile feedback layer 508 may be included. The tactile feedback layer 508 may include a transducer configured to provide a sensory feedback when a switch on the resistive switch layer detects actuation of a key. In one embodiment, the transducer is a piezoelectric transducer configured to apply a mechanical "pop" to the user interface 500 that is strong enough to be detected by the user. Thus, the tactile feedback layer provides sensory feedback to the user, thereby making the smooth, substantially planar user interface 500 react more like a conventional keypad without the need of individual popple-enabled keys protruding through the keypad.

Figure 6:
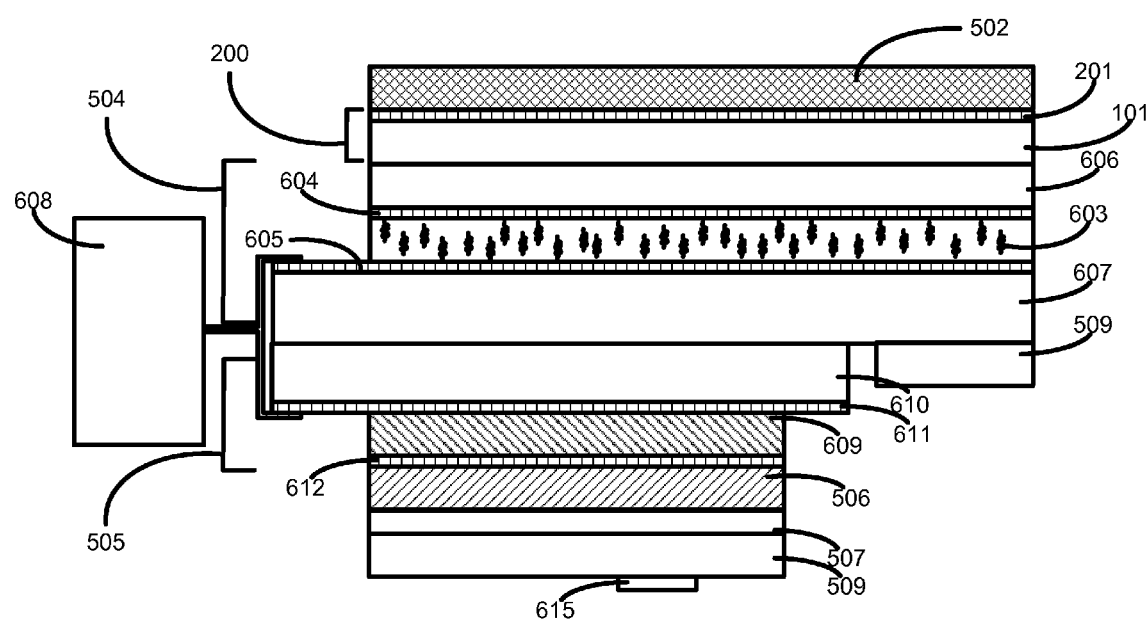
FIG. 6 illustrates a sectional view of an electronic device employing embodiments of the present invention.

Turning now to FIG. 6, illustrated therein is a side view of the user interface. Each layer may be seen from the side in a cut-away view. Again, it will be clear to those of ordinary skill in the art having the benefit of this disclosure that the invention is not limited to the specific structure shown in FIG. 6. Some layers, as noted above, are optional and may not be included in certain applications.

Note that the layers may be coupled together in any of a variety of ways. One exemplary embodiment of a coupling mechanism is by using a thin layer of clear (transparent), non-conductive adhesive. For instance, the cover layer 502, the capacitive sensor 200, and the optical shutter assembly 504 may each be mechanically coupled together with non-conductive, translucent adhesive. This coupling keeps the overall assembly properly aligned within the device.

When viewing from the top, a user first sees the cover layer 502, which may be either a thin film plastic or glass layer. Where glass is used, reinforced glass is often preferred to provide additional reliability to the user interface (500). The glass may be reinforced by a strengthening process, such as a chemical or heat treatment process. As noted above, the cover layer may include printing disposed thereon.

Next, the capacitive sensor 200 may be seen. The capacitive sensor 200 includes both the capacitive sensor material 201 and substrate layer 101. As noted above, the substrate layer 101, which may be either rigid, or soft (for instance a silicone layer), carries the electrode plates that form the capacitive sensors. The electrodes may be used in a singular configuration, or in pairs. Further alternate electrode pairs, including electrode groupings of two, four, or six electrodes, may be used to form the capacitive sensors. The at least one graphic (401) is also included.

Next, the optical shutter assembly 504 may be seen. In one embodiment, the segmented electro-optical device of the optical shutter assembly 504 is manufactured using a twisted nematic liquid crystal display material. Other materials, including polymer-dispersed liquid crystal material, super twisted nematic liquid crystal material, ferro-electric liquid crystal material, electrically-controlled birefringent material, optically-compensated bend mode material, guest-host materials, and other types of light modulating may equally be used.

The optical shutter assembly 504 includes twisted nematic liquid crystal display material 603 that is sandwiched between two electrodes 604,605 and two substrates 606,607. The electrodes 604,605 and substrates 606,607 are preferably transparent, such that light can pass freely through each. The substrates 606,607 may be manufactured from either plastic or glass. The upper electrode 604 is constructed, in one embodiment using indium-tin oxide affixed to substrate 606. The lower electrode 605 is constructed using a patterned indium-tin oxide layer affixed to the lower substrate 607. In one embodiment, the patterns are those of alphanumeric keys or symbols representing keys or user actuation targets of the device. Where it suits the particular design or application, both electrodes 604,605 can be patterned; however, user visibility may be affected where both electrodes 604,605 are patterned. The patterned electrode(s) 605, by way of patterned electrical traces, is connected to a control circuit 608, which may also connect to the capacitive sensor 200. The control circuit 608 applies a field to the patterned electrode(s) 305, while the other electrode 304 acts as a ground.

The electric field applied alters the light transmission properties of the twisted nematic liquid crystal display material 603. The electric field can cause sections under each of the patterned electrodes 605 to transition from a first state to a second state. By way of example, the first state may be opaque, while the second state is translucent. The patterns of the patterned electrodes 605 define the images of each shutter in the optical shutter. By way of example, a shutter can be patterned as a "9 key" for a phone by patterning one electrode as a box (i.e. the boundary of the key), and another electrode as the "9 wxyz" characters. The shutters thus act as "windows" that can be open or closed, to reveal or hide images.

The optical shutter assembly 504 also includes multiple polarizing layers disposed atop and beneath the optical shutter. These polarizing layers polarize light along a polarization axis and provide a predetermined color to the overall display assembly.

In some embodiments, there may be a need for additional graphics presentation capabilities above and beyond that provided by the capacitive sensor layer. In such embodiments, a liquid crystal display may be disposed between the capacitive sensor 200 and the optical shutter assembly 504. The liquid crystal display is used to present graphics through the capacitive sensor 200 to the user.

The electroluminescent device 505 includes a layer of electroluminescent material 609 sandwiched between a transparent substrate 610 bearing a single, or patterned, indium tin oxide electrode(s) 611 and a ground electrode 612. In one embodiment, the patterned electrode 611 of the electroluminescent device 505 is aligned with the various shutters of the optical shutter assembly 504. In such an embodiment, the ground electrode 612 may comprise a solid conductive ink layer printed on the bottom surface of the electroluminescent material 609. This solid conductive ink layer may have reflective properties. Alternatively, the electroluminescent device 505 may have a reflective layer integrated beneath the ground electrode 612. Also, the ground electrode 612 may be patterned and may be borne on a reflective substrate if desired. One electrode layer 601 is connected to control circuit 608.

In one embodiment, the high-resolution display 509 is disposed at least partially under the optical shutter assembly 254. In such an embodiment, the optical shutter assembly 504 passes across the high-resolution display 509, thereby covering at least a portion of the high-resolution display 509. Thus, when a shutter above the high-resolution display 509 closes, the high-resolution display 509 is completely hidden. This action gives the overall device a "blank" face when the electronic device is OFF. Beneath the electroluminescent device 505 are the resistive switch layer 506, the substrate layer 507, and the tactile feedback layer 508 with its transducer 615.

Figure 7:
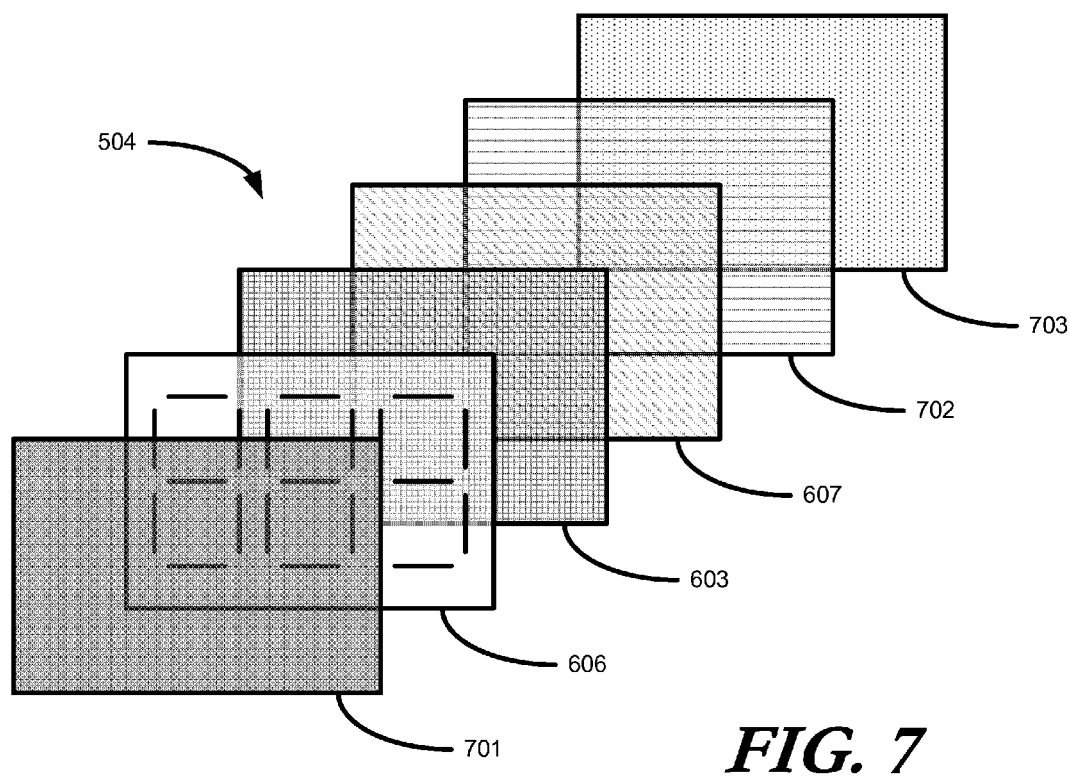
FIG. 7 illustrates one embodiment of a twisted-nematic display for use in an electronic device employing embodiments of the invention.

Turning now to FIG. 7, illustrated therein is an exploded view of an optical shutter assembly 504. The optical shutter assembly 504, in accordance with the illustrated exemplary embodiment, is referred to as "twisted" because it contains liquid crystal elements that twist and untwist in differing amounts to allow light to pass through.

A first polarizer 701 is disposed on one side of the device to polarize incident light. A substrate 606, having indium tin oxide electrodes (as previously discussed) printed in varying shapes is disposed adjacent to the polarizer. The electrodes may be disposed in shapes that correspond to the alphanumeric keys or symbols associated with the keys of the electronic device.

Twisted nematic liquid crystal display material 603 is then next, followed by another substrate 607 configured with ground electrodes. A horizontal filter 702 then is used to permit and block light. A reflective or transflective surface 703 may optionally be used to reflect light back (in a reflective mode), or to transmit light in a transflective mode.

When no voltage is applied to the electrodes, the device is in a first state. When voltage is applied the liquid crystal material twists—in incremental amounts up to 90 degrees—thereby changing the luminous polarization. This liquid crystal thus acts as a controllable polarizer, controlled by electrical signals applied to the electrodes. Adjustment of the voltage being applied to the electrodes permits varying levels grey, as well as transparent states or opaque states to be created. Embodiments of the present invention use this device as a low-resolution display to reveal and hide keys.

Figure 8:
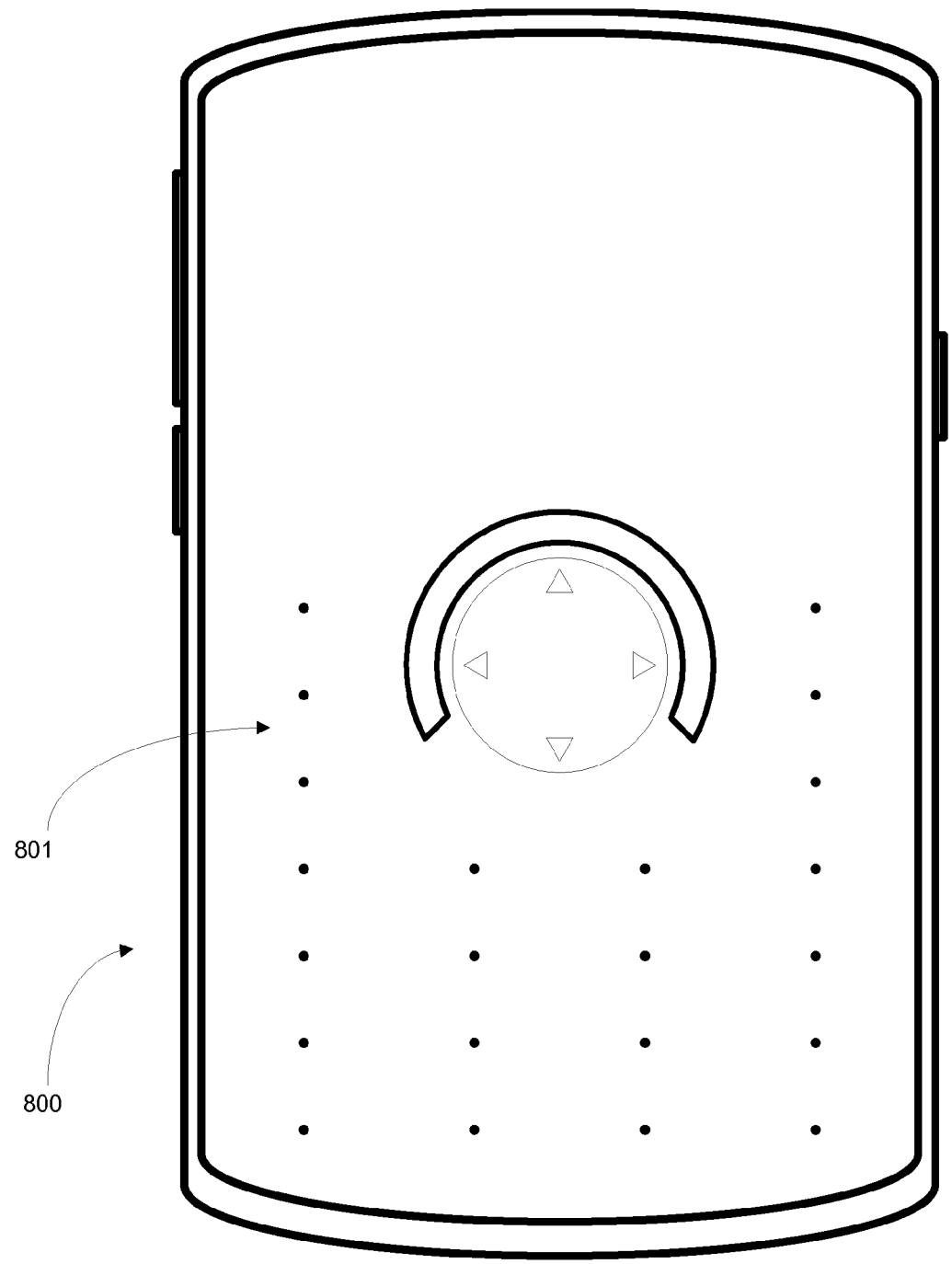
FIG. 8 illustrates one embodiment of an electronic device employing embodiments of the invention when in an OFF, low-power, sleep, or idle mode.

Turning now to FIG. 8, illustrated therein is an electronic device 800 having a user interface 801 configured to receive touch input in accordance with embodiments of the invention. The electronic device 800 of FIG. 2, shown illustratively as a radiotelephone, is in the OFF mode. The view of FIG. 8 may also arise when the electronic device 800 is in a low power state, a sleep state, or an idle mode. When the optical shutter assembly (504) covers both the keypad region and the high resolution display, the user interface 801 of the electronic device 800 will be blank when the device is in this state. This occurs because each of the shutters is closed (i.e. in the opaque state), thereby prohibiting visibility of either the high-resolution display or any of the plurality of keypad configurations. Small demarcations may be present on the cover layer of the device to orient the user to the keypad region.

Figure 9:
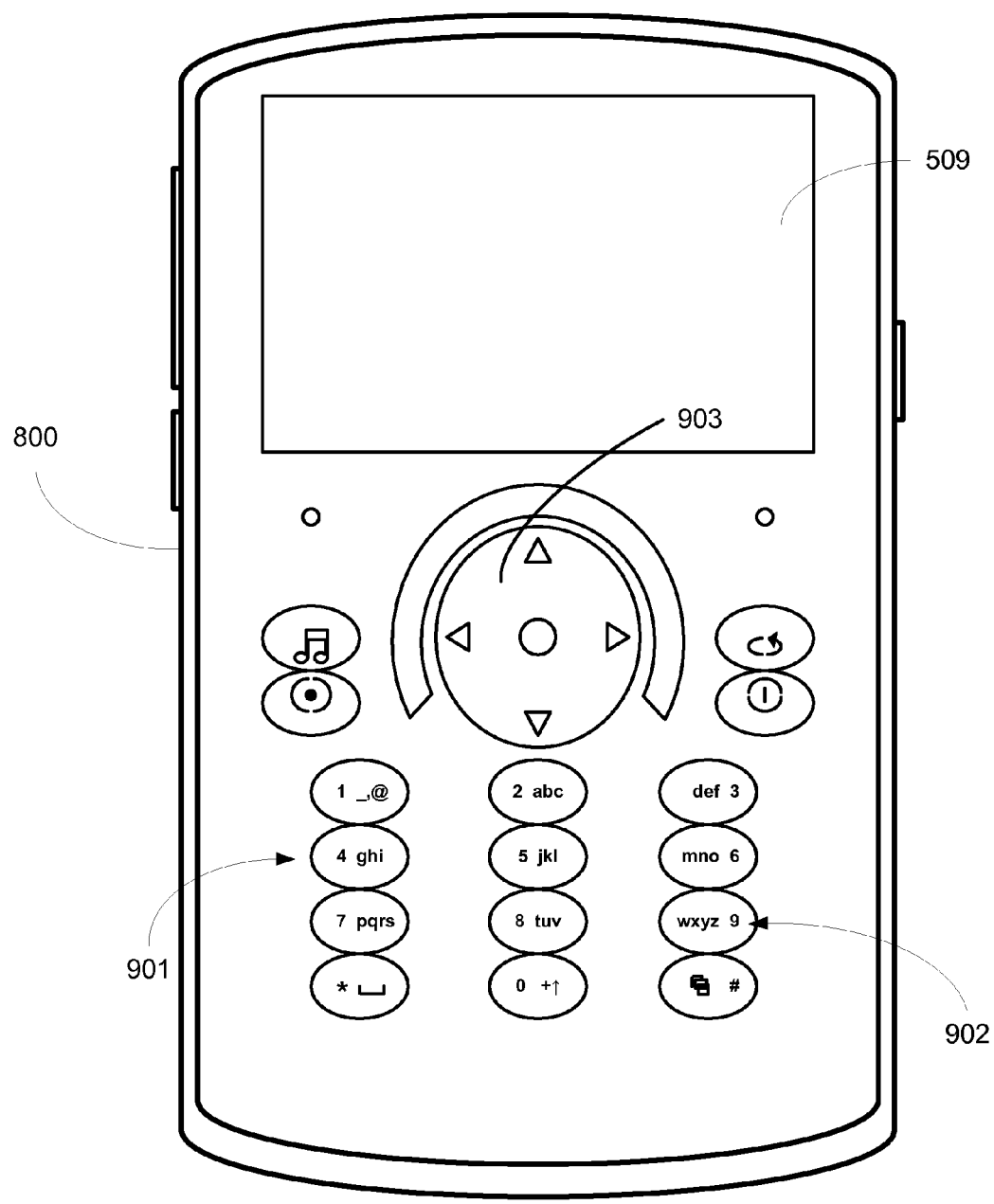
FIG. 9 illustrates one embodiment of an electronic device employing embodiments of the invention when active.

Turning now to FIG. 9, illustrated therein is the electronic device 800 from FIG. 8 having changed from the OFF state (or alternatively a low power state) to an ON state. The electronic device 800 may be converted from the OFF or low power mode to an ON mode in one of a variety of ways. A first method is for a user to actuate the capacitive sensor. A second method is from an external event or a device event. When transitioning from the OFF state or low power state to the ON state, the electronic device 800 opens at least one display segment 901, thereby transitioning that segment 901 to the translucent state. One configuration of the plurality of keypad configurations 902, or the high-resolution display 509, or both, then becomes visible to the user. In one embodiment, when the segmented optical shutter device is in the ON state, at least a curved scroll device 903 is presented on the user interface surface.

Figure 10:
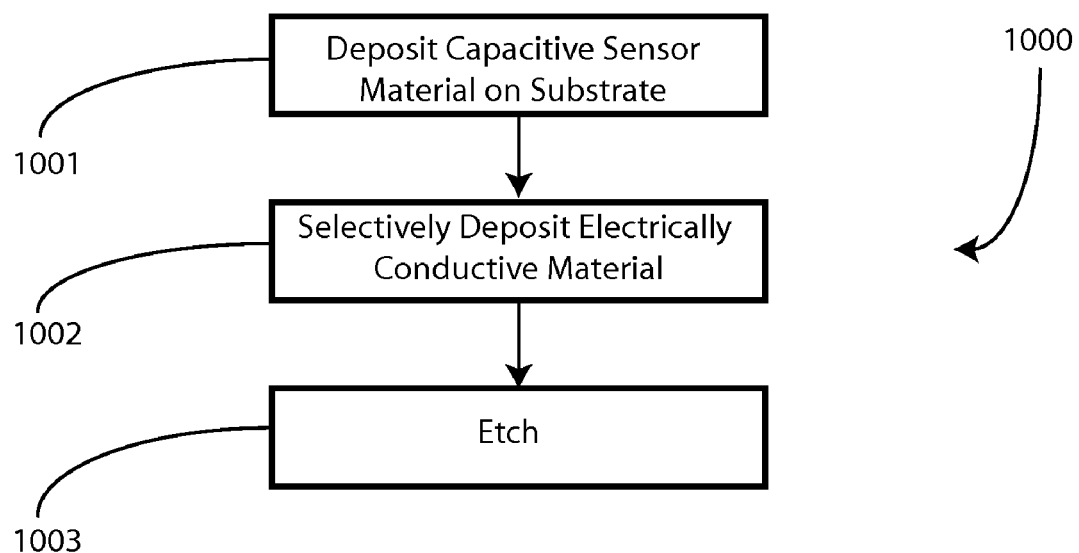
FIG. 10 illustrates one embodiment of a method for constructing a capacitive sensor in accordance with embodiments of the invention.

Turning now to FIG. 10, illustrated therein is one embodiment of a method 1000 of manufacturing a capacitive sensor having visible graphic indicia for an electronic device in accordance with the invention. At step 1001, a layer of semi-transparent, electrically conductive material, such as indium-tin oxide, is deposited on a substrate. At step 1002, a layer of electrically conductive material is deposited selectively on the semi-transparent, electrically conductive material as visible graphic indicia. The layer of electrically conductive material may be any of a thicker layer of indium-tin oxide, a layer of indium-tin oxide with a different doping, a layer of metal such as gold or aluminum, or other equivalent material. The layer of electrically coupled material is deposited such that it is electrically coupled to the layer of semi-transparent, electrically conductive material. Additionally, the layer of electrically conductive material has a greater reflectivity than does the layer of semitransparent, electrically conductive material.

At step 1103, if needed, both the layer of semi-transparent, electrically conductive material and the layer of electrically conductive material may be etched, thereby yielding or forming a predetermined electrode pattern. While both the layer of semi-transparent, electrically conductive material and the layer of electrically conductive material will be etched, the visible graphic indicia will still be legible so long as the spacing between the electrodes is sufficiently small.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention.

What is claimed is:

1. A capacitive sensor for an electronic device configured to present selected graphics to a user, the capacitive sensor comprising:
   a substrate configured to transmit incident light;
   a layer of capacitive sensor material disposed on the substrate, the layer of capacitive sensor material being electrically conductive and pellucid; and
   a layer of selectively disposed, electrically conductive material electrically coupled to the layer of capacitive sensor material;
   wherein a combination of the layer of selectively disposed electrically conductive material and the layer of capacitive sensor material has a greater reflectivity than the layer of capacitive sensor material;
   further wherein the layer of electrically conductive material is arranged as at least one graphic visible to the user.

2. The capacitive sensor of claim 1, wherein at least the layer of capacitive sensor material is arranged as a plurality of electrodes.

3. The capacitive sensor of claim 2, further comprising a detector coupled to the layer of capacitive sensor material, the detector being configured to detect a change in capacitance between at least two of the plurality of electrodes.

4. The capacitive sensor of claim 1, wherein the layer of selectively disposed, electrically conductive material is disposed atop the layer of capacitive sensor material.

5. The capacitive sensor of claim 1, wherein the layer of selectively disposed, electrically conductive material is interspersed with the layer of capacitive sensor material.

6. The capacitive sensor of claim 1, wherein the layer of capacitive sensor material has a characteristic impedance that is greater than a characteristic impedance of the selectively disposed, electrically conductive material.

7. The capacitive sensor of claim 6, wherein both the layer of capacitor sensor material and the layer of selectively disposed, electrically conductive material comprise indium tin oxide.

8. The capacitive sensor of claim 1, wherein the layer of selectively disposed, electrically conductive material is arranged as one of a plurality of user actuation targets, a navigation device, alphanumeric text, or symbols.

9. The capacitive sensor of claim 1, wherein the layer of selectively disposed electrically conductive material and the layer of capacitive sensor material together have a greater reflectivity than the layer of capacitive sensor material, wherein the greater reflectivity is at least twice that of the layer of capacitive sensor material.

10. A method of manufacturing a capacitive sensor having visible graphic indicia for an electronic device, the method comprising the steps of:
    depositing a layer of semitransparent, electrically conductive material on a substrate; and
    selectively depositing, in a form of the visible graphic indicia, second layer of electrically conductive material on the substrate;
    wherein the second layer of electrically conductive material is electrically coupled to at least a portion of the layer of semitransparent, electrically conductive material;
    further wherein a combined material formed by the layer of semitransparent, electrically conductive material and the second layer of electrically conductive material has a greater reflectivity than does the layer of semitransparent, electrically conductive material.

11. The method of claim 10, further comprising the step of etching at least one of the layer of semitransparent material or the second layer of electrically conductive material, thereby forming a predetermined electrode pattern.

12. The method of claim 10, wherein the step of selectively depositing, in the form of the visible graphic indicia, the second layer of electrically conductive material comprises depositing an additional layer of semitransparent, electrically conductive material such that the visible graphic indicia has a thickness greater than the layer of semitransparent, electrically conductive material.

13. The method of claim 10, wherein the step of depositing the semitransparent, electrically conductive material on the substrate comprises depositing indium tin oxide on the substrate, further wherein the step of selectively depositing, in the form of the visible graphic indicia, the second layer of electrically conductive material comprises depositing indium tin oxide on the layer of semitransparent, electrically conductive material.

14. The method of claim 10, wherein the step of depositing the semitransparent, electrically conductive material on the substrate comprises depositing indium tin oxide on the substrate, further wherein the step of selectively depositing, in the form of the visible graphic indicia, the second layer of electrically conductive material comprises depositing metal on the layer of semitransparent, electrically conductive material.

15. A electronic device comprising a user interface for receiving a touch input, the user interface comprising:
    a cover layer; and
    a capacitive sensor layer disposed beneath the cover layer for detecting the touch input, the capacitive sensor layer comprising at least two types of capacitor sensor material, wherein a first type of capacitor sensor material is at least semitransparent and a second type of capacitor sensor material has a greater reflectivity than the first type of capacitor sensor material, wherein the at least two types of capacitor sensor material are electrically coupled together;
    further wherein the second type of capacitor sensor material is arranged as at least one graphic visible through the cover layer.

16. The electronic device of claim 15, further comprising a segmented optical shutter layer disposed beneath the capacitive sensor layer, the segmented optical shutter layer being configured to present multiple user interface configurations.

17. The electronic device of claim 16, further comprising an electroluminescent device disposed beneath the segmented optical shutter layer.

18. The electronic device of claim 17, further comprising further comprising a resistance sensing layer, configured to detect contact with the user interface, disposed beneath the electroluminescent device.

19. The electronic device of claim 16, further comprising a liquid crystal display disposed beneath the segmented optical shutter layer.

20. The electronic device of claim 15, wherein the second type of capacitor material is a thicker layer of the first type of capacitive sensor material.

* * * * *